United States Patent
Endre

[11] Patent Number: 5,178,308
[45] Date of Patent: Jan. 12, 1993

[54] CURVED CONTAINER

[76] Inventor: Jay Endre, P.O. Box 632, Marshall, Va. 22115

[21] Appl. No.: 712,722

[22] Filed: Jun. 10, 1991

[51] Int. Cl.$^5$ .............................................. B65D 23/00
[52] U.S. Cl. ........................... 224/32 R; 220/DIG. 13; 12/114; 215/31
[58] Field of Search ..................... 224/30 R, 32 R, 34, 224/35, 36, 39, 41, 42.42, 42.45, 148; 220/669, DIG. 13, 85 H, 669, 674, 675, 743; 4/114.1, 144.1, 144.3; 215/16, 11.1, 31; 248/311.2, 312, 312.1; D9/373; D12/114; 206/217, 542, 546, 544

[56] References Cited

U.S. PATENT DOCUMENTS

| | | | |
|---|---|---|---|
| D. 296,666 | 7/1988 | Hunt | D9/373 |
| D. 316,389 | 4/1991 | Wood et al. | D12/114 X |
| 3,920,140 | 11/1925 | Kiser | 224/32 R X |
| 4,095,812 | 6/1978 | Rowe | 224/32 R X |
| 4,270,231 | 6/1981 | Zint | 4/144.1 |
| 4,345,704 | 8/1982 | Boughton | 224/39 |
| 4,366,922 | 1/1983 | Levine et al. | 224/32 R |
| 4,386,721 | 6/1983 | Shimano | 224/39 |
| 4,441,638 | 4/1984 | Shimano | 224/39 X |
| 4,665,571 | 5/1987 | Muccione | 4/114.1 X |
| 4,676,387 | 6/1987 | Stephenson et al. | 215/11.1 |
| 4,832,213 | 5/1989 | Sharon et al. | D9/373 X |
| 5,024,358 | 6/1991 | Reichert et al. | 224/148 X |

FOREIGN PATENT DOCUMENTS 2496584  6/1982  France ............................. 224/30 R Primary Examiner—Henry J. Recla
Assistant Examiner—Glenn T. Barrett
Attorney, Agent, or Firm—Aquilino & Welsh

[57] ABSTRACT

A curved food container having a cylindrical body portion, a curved extension portion and a mouth portion. The mouth is covered by a removable closure in order to retain the contents. The body portion includes an indentation for positioning, orienting and securing the container to a holder attached to a bicycle frame such that the mouth of the container extends away from the indentation and frame.

6 Claims, 2 Drawing Sheets

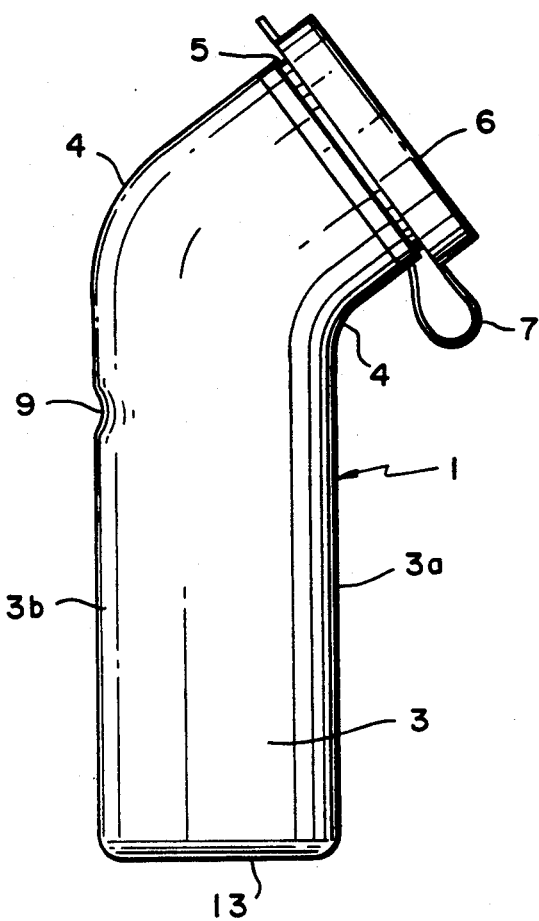
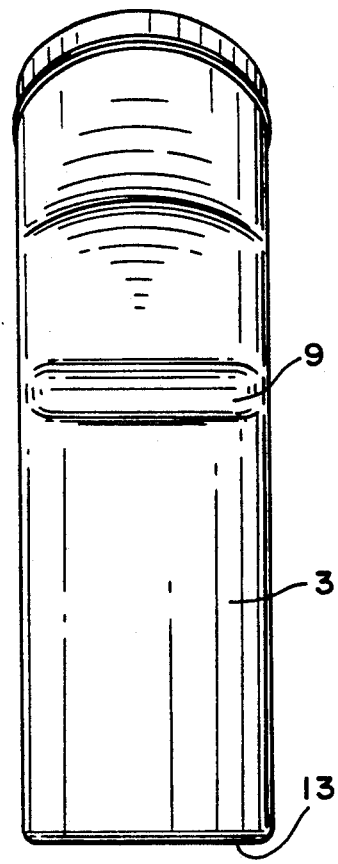
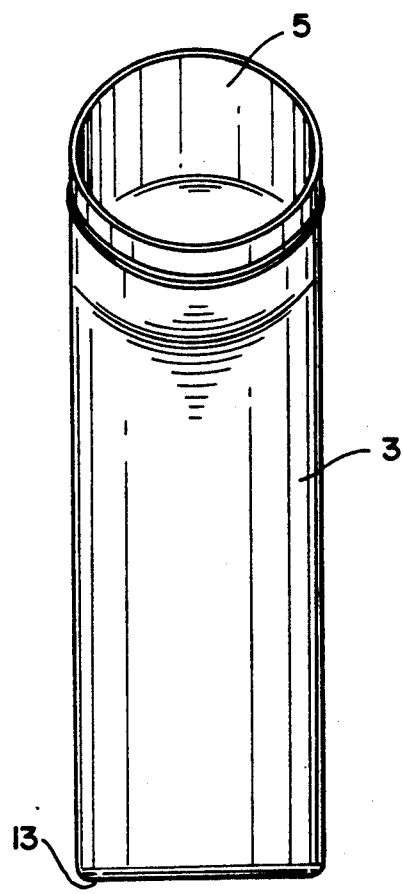

CURVED CONTAINER

FIELD OF THE INVENTION

This invention relates to a food container for a bicycle and, more particularly, to a food container shaped to fit into a standard bicycle water-bottle holder mounted to a frame of the bicycle so that a cyclist can remove solid food with one hand while riding the bicycle.

BACKGROUND OF THE INVENTION

A bicycle for sport or recreation makes provision for mounting a water-bottle within reach of the operator so that he/she can safely, easily and with one hand retrieve or replace the waterbottle. One does not only lose water while bicycling, but also expends energy, or glucose/blood sugar. Therefore, studies have shown that on long trips a rider should to replenish this energy every 60 minutes with solid foods, such as fruit. No such light weight device for solid food has been available before that will enable the operator of the bicycle to reach, open and remove from a storage container solid food, like fruit.

Thus, with the increasing popularity of the sport and the lack of any known containers for holding solid foods to a bicycle frame utilizing a standard water bottle holder, the invention was developed.

SUMMARY OF THE INVENTION

The food container comprises a hollow cylindrical body with an indentation in one location on the body for securing and orientating the container in a holder, a curved extension of the cylindrical body, a mouth, and a closure, such as a screw cap or snap type closure.

The indentation positions, orients and secures the food container in a conventional water bottle holder. The curvature at the end of the cylindrical body accommodates elongated and curved fruits, such as bananas, and positions the cap or closure away from the frame of the bicycle to accommodate a cap being sized larger than the mouth/body.

An object of the invention is to provide a curved container that can accept and hold elongated and curved foods, like bananas, as well as foods in various other shapes.

A further object of the invention is to provide a curve in the container body so that the mouth of the container is positioned away from the bicycle frame to which the holder is attached. So positioned, the mouth is more easily accessible to the operator and the closure can be opened with no interference from the bicycle frame.

Another object of the invention is to provide a food container mounted on the frame of a bicycle so that the operator of the cycle can reach the container, open the container, remove solid food items from the container and return food scraps to the container while riding the bicycle.

BRIEF DESCRIPTION OF THE DRAWINGS

FIG. 3 is an enlarged view of the curved container with a snap closure.

FIG. 4 is a rear view of the curved container in the area of the indentation.

FIG. 5 is a front view of the curved container.

DETAILED DESCRIPTION OF THE INVENTION

Figure 1:
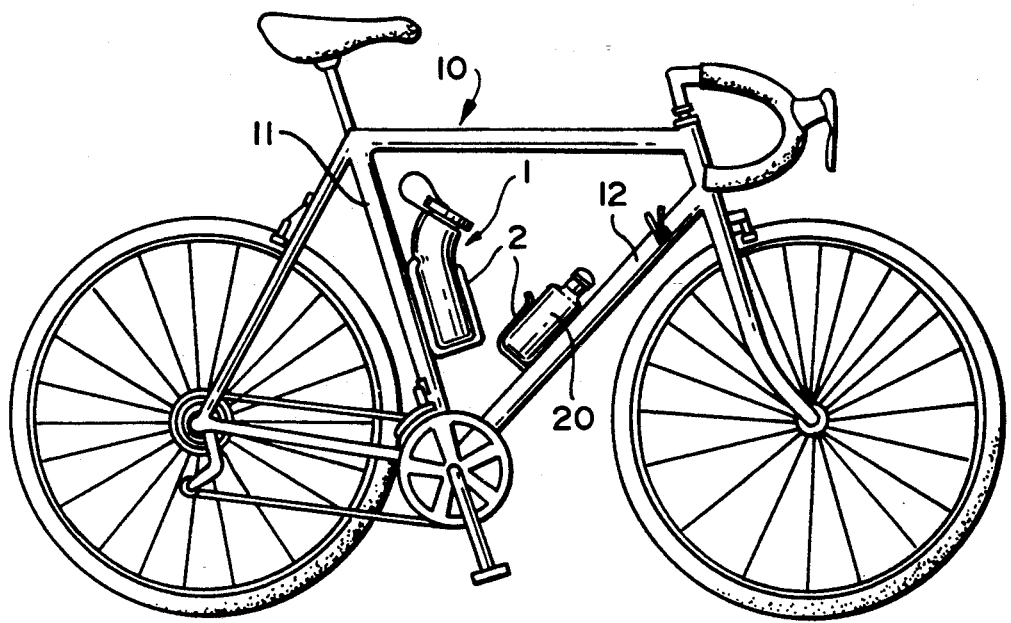
FIG. 1 is a general view of a bicycle with the curved container mounted on one frame member and a common water-bottle mounted on another frame member.

Referring to FIG. 1, the curved food container 1 is shown held in a holder or standard water-bottle cage 2 mounted on the vertical seat tube frame member 11 of the bicycle 10. Also shown is a conventional water bottle 20 being secured to the bicycle frame member 12. Since, the curved container 1 is designed so as to be held in a standard water bottle cage 2, the position of water bottle 20 and curved container 1 can be interchanged.

Figure 2:
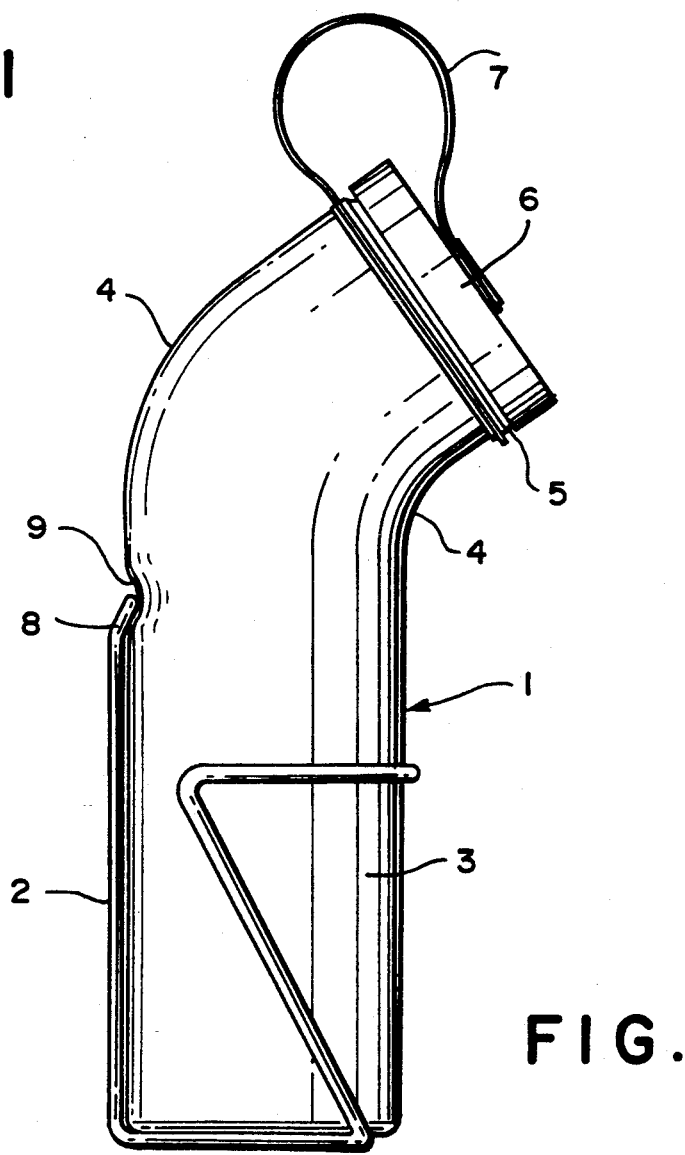
FIG. 2 is an enlarged view of the curved container with a screw cap in a standard water-bottle holder.

A more detailed view of curved food container 1 can be seen in FIG. 2. With reference to FIG. 2, the curved food container 1 includes a straight hollow cylindrical body portion 3 having a curved extension portion 4 and an open mouth 5. The container 1 further includes a closure 6 which may be a screw cap, snap cap or any other suitable closure. The closure is secured to the container 1 by a tether or flexible strap 7. The body portion 3 includes a bottom 13 so that when closure 6 is attached, an enclosed receptacle is formed. The preferred shape of the curved food container 1 is cylindrical but various other shapes are possible, for example rectangular or hexagonal. The container can be manufactured from any suitable resilient material, but the preferred material is plastic.

The diameter of container 1 is such that it will accept solid food items such as fruit comprising oranges, apples and similarly shaped solid foods but not so large as to interfere with the operator's legs while pedaling the bicycle. The curved extension portion 4 allows for elongated or curved food items like bananas to be stored. The diameter of curved extension 4 may be the same size as the straight body 3 or it may be slightly larger. The diameter of the mouth 5 is at least the same size as the diameter of curved extension 4. Thus, the mouth 5 may be sliqhtly larger in diameter than the body, or in other words flare out. This makes it easier of the rider to insert their hand while retrieving the contents of the container 1.

The cage 2 shown in FIG. 2 is a standard wire frame holder commonly used to secure a water filled bottle to a bicycle frame member or seat frame member as shown in FIG. 1. Such cages have a curved finger 8 which cooperates with the curved portion of the water bottle to secure the bottle thereto.

The straight body portion 3 of the container 1 has an indentation 9, as best shown in FIG. 4. Indentation 9 mates with the cage 2 at the position of the curved finger 8 in order to securely hold the curved food container 1. The location of the indentation 9 on the curved food container 1 is such that the curved extension portion 4 extends in a direction away from the location of indentation 9, thereby being in opposition to the mouth 5. Thus, the location of the indentation 9 not only serves to hold the food container but also orients the container 1 in the cage 2 to keep the container in the sam favorable position.

The location of indentation 9 in the body portion 3 is an important feature as it prevents the container 1 from rotating, while also positioning the mouth 5 of the container 1 to extend away from the frame member of the bicycle to which it is attached.

As can be seen, the indentation 9 is located on the backside 3b of body portion 3 and is of such a size to accommodate finger 8, while not interfering with the contents of the container. Ergo, if an orange is put into the container, it may later be rolled back out.

While various preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A curved cylindrical container for holding food which is adapted to be attached to a bicycle water bottle holder located on a bicycle frame, said container comprising:
   a hollow body portion having a diameter;
   an open mouth portion;
   a curved extension portion integrally connecting said body portion to said mouth portion; and
   wherein said body portion includes an indentation which is adapted to engage a a portion of the bicycle water bottle holder for holding said container within said holder and said mouth portion having a diameter which is equal to or greater than the diameter of said hollow body portion.

2. The invention of claim 1, wherein the curved extension portion curves in a direction away from said indentation.

3. The invention of claim 1, further including a closure.

4. The invention of claim 3, wherein said closure is secured to the container by a tether.

5. The invention of claim 1 wherein said indentation is located between said hollow body portion and said curved extension portion.

6. The invention of claim 2 wherein said indentation is located between said hollow body portion and said curved extension portion.

* * * * *